April 12, 1932.  W. L. McLAINE ET AL  1,853,915

DRILL PIPE PROTECTOR

Filed Sept. 20, 1929

RICHARD A. SPERRY
WILLIAM L. McLAINE
INVENTORS

*Paul W. Brizman*
ATTORNEY

Patented Apr. 12, 1932

1,853,915

UNITED STATES PATENT OFFICE

WILLIAM L. McLAINE AND RICHARD A. SPERRY, OF LOS ANGELES, CALIFORNIA, ASSIGNORS OF ONE-THIRD TO E. M. SMITH COMPANY, OF LOS ANGELES, CALIFORNIA, A CORPORATION OF CALIFORNIA

DRILL PIPE PROTECTOR

Application filed September 20, 1929. Serial No. 393,990.

Our invention pertains to the art of rotary well drilling and specifically to the protection of drill pipe and tool joints from chafing against the casing within which they are raised, lowered and revolved during the drilling of a well.

The object of our invention is to provide a protective band which can be readily and quickly placed around a drill pipe without springing it over the tool joints, which can be economically manufactured and which will be durable and will retain its predetermined position on the pipe.

Our improved protector consists substantially of a band of sheet metal with an interlocking joint at each end, the metal being relieved at suitable intervals to allow for the projection of rubber knobs or knobs of other elastic material supported by cotton or other suitable fabric.

Figure 1:
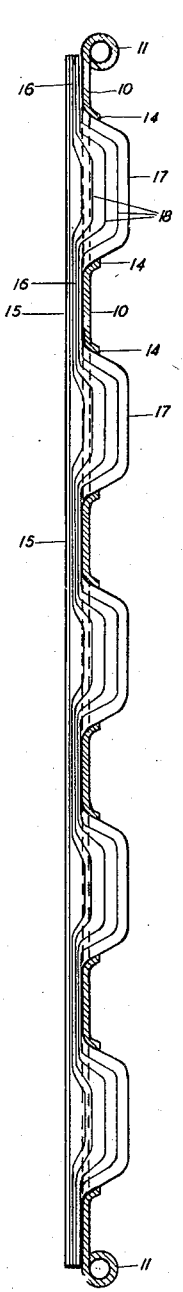
Figure 2:
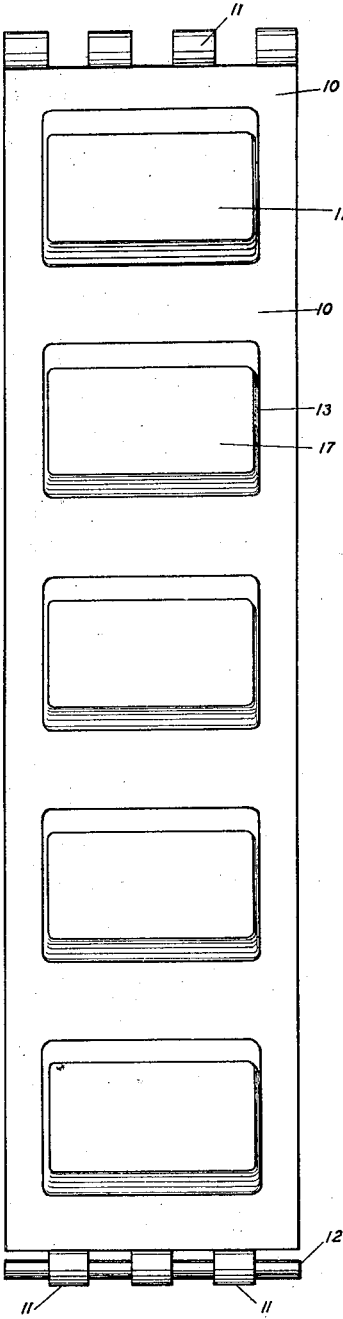
Figure 3:
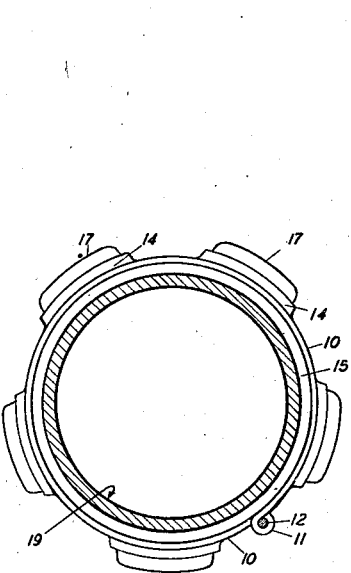

A preferred manner of constructing our improved protector is illustrated in the attached drawings and the following description thereof, in which, Fig. 1 is a cross section of a protector extended in a straight line, Fig. 2 is a plane view of Fig. 1, and, Fig. 3 is a side elevation of a protector in place around a portion of pipe shown in section.

Referring to the drawings: 10 is a strip of steel or other suitable thin metal, at the opposite ends of which are formed the loops 11 for insertion of the locking pin 12. In this strip of metal we form the openings 13 which preferably have upturned edges as indicated at 14.

On the lower or left hand side of this strip we place a band 15 composed of soft rubber or of an elastic rubber compound, in which is embedded several plies of string woven fabric 16, a suitable material being the fabric used in the manufacture of automobile tire casings. On the opposite side of this band and projecting through the openings 13 we form knobs of rubber 17 and carry the fabric into the body of these knobs as indicated at 18. The rubber and fabric knobs should project beyond the metallic strip for a sufficient distance to allow material wear from the ends of the knobs before the metal of the strip comes in contact with the wall of the pipe. We would suggest a projection beyond the upturned edge 14 of say ¼ inch for a protector to fit a four inch pipe, of ½ inch for eight inch pipe, and a correspondingly greater projection for larger sizes. The greater the projection the longer will be the life of the fitting, but it is not feasible to make small knobs of too great a height, as knobs not having a sufficient base in proportion with their height have a tendency to roll over and tear off instead of wearing smoothly from their upper surface.

The length of the strip must be such that when it is wound around the pipe indicated at 19 in Fig. 3, the pin 12 may be inserted through the openings in the loops 11. This insertion should be possible only when the strip is drawn very tightly around the pipe so that the inside of the rubber band 16 may be placed in compression to keep the fitting from revolving on the pipe.

Our improved fitting has three major advantages over the solid rubber rings heretofore used. The first advantage is that the fabric insertion and the metallic strip surrounding the band gives it a high degree of permanence as it will not stretch and loosen. The second advantage is that the protector may be placed around the drill pipe without breaking any joints, which is of material importance when the drill pipe is already made up into stands. The third advantage is that by the use of projecting lugs of rubber the cross sectional area of a protector of any given diameter is reduced by the amount of free space left between the lugs, thus reducing restriction of the circulation of drilling mud. This advantage alone is of great importance in drilling deep holes, where casing of small diameter must often be used.

While we prefer to construct our improved fitting with fabric in the projecting knobs as above described, we obtain material advantages by the use of the structure shown, even when the fabric insertion is omitted, and wish to claim as broadly as the state of the art will permit a pipe protector having knobs or lugs or rubber or its equivalent projecting through openings in a metallic band.

While we have disclosed a protector in which the projecting knobs are rectangular in form and occupy a large part of the width of the band, we do not restrict ourselves to any particular form of knob, but may use knobs of a round, square, or other shape and may use a relatively small number or a multiplicity of knobs.

We claim as our invention:

1. A pipe protector comprising: a metallic band; means for conjoining the ends of said band; openings through said band, and knobs of resilient material retained within said band and projecting through said openings.

2. A pipe protector comprising: a metallic band; means for conjoining the ends of said band; openings through said band, a strip of resilient material placed on the inner side of said band, and projections integral with said rubber strip extending through said openings.

3. A pipe protector comprising: a metallic band; means for conjoining the ends of said band; openings through said band; a laminated strip of layers of resilient material and fabric placed within said band, and knobs of resilient material projecting from said strip through said openings.

4. A pipe protector comprising: a metallic band; means for conjoining the ends of said band; openings through said band; a laminated strip of layers of resilient material and fabric placed within said band, and knobs of resilient material having said layers of fabric incorporated therein projecting from said strip and through said openings.

5. A pipe protector comprising: a metallic band; means for conjoining the ends of said band; openings through said band, and knobs of rubber retained within said band and projecting through said openings.

6. A pipe protector comprising: a metallic band; means for conjoining the ends of said band; openings through said band, a strip of rubber placed on the inner side of said band, and projections integral with said rubber strip extending through said openings.

7. A pipe protector comprising: a metallic band; means for conjoining the ends of said band; openings through said band; a laminated strip of layers of rubber and fabric placed within said band, and knobs of rubber projecting from said strip through said openings.

8. A pipe protector comprising: a metallic band; means for conjoining the ends of said band; openings through said band; a laminated strip of layers of rubber and fabric placed within said band, and knobs of rubber having said layers of fabric incorporated therein projecting from said strip and through said openings.

9. A pipe protector comprising: a metallic band having openings therein; means for conjoining the ends of said band; and wear receiving bodies retained within said band and projecting through said openings.

10. A pipe protector comprising: a metallic band having openings therein; means for conjoining the ends of said band; a supporting strip on the inner side of said band; and wear receiving bodies on said supporting strip and projecting through said openings.

11. A pipe protector for use in a well, comprising: a cylindrical supporting member adapted to surround said pipe, said supporting member having openings therein; and wear receiving bodies retained within said openings and projecting through said openings in position to engage the wall of the well.

12. A pipe protector for use in a well, comprising: a cylindrical supporting member adapted to surround said pipe, said supporting member having openings therein; a wall of resilient material within said supporting member and adapted to be held against said pipe by said supporting member; and wear receiving bodies projecting from said wall and out through said openings into positions for engagement with the wall of the well.

13. A pipe protector of the character described, including: a curved wall adapted to fit the exterior of said pipe, said wall having a plurality of spaced wear receiving bodies projecting radially therefrom; and clamping means for securing said wall to said drill pipe comprising a circular member adapted to fit around said wall and having means therewith for constricting the circular member on said wall so as to compress said wall against said pipe.

14. A pipe protector of the character described, including: a wall of resilient material adapted to fit the exterior of said pipe, said wall having a radially projected wear receiving portion; and clamping means for securing said wall to said drill pipe comprising a circular member adapted to fit around said wall and having means therewith for constricting the circular member on said wall so as to compress said wall against said pipe.

In witness that we claim the foregoing we have hereunto subscribed our names this 10th day of September, 1929.

WILLIAM L. McLAINE.
RICHARD A. SPERRY.